（12） United States Patent
Damjanovic

(10) Patent No.: US 9,973,001 B2
(45) Date of Patent: May 15, 2018

(54) ZERO SEQUENCE, FIFTH HARMONIC FILTER FOR FIVE-PHASE POWER DISTRIBUTION SYSTEM

(71) Applicant: Aleksandar B. Damjanovic, Oldsmar, FL (US)

(72) Inventor: Aleksandar B. Damjanovic, Oldsmar, FL (US)

( * ) Notice: Subject to any disclaimer, the term of this patent is extended or adjusted under 35 U.S.C. 154(b) by 148 days.

(21) Appl. No.: 14/969,520

(22) Filed: Dec. 15, 2015

(65) Prior Publication Data

US 2017/0170657 A1 Jun. 15, 2017

(51) Int. Cl.
*H02J 3/01* (2006.01)
(52) U.S. Cl.
CPC .................................... *H02J 3/01* (2013.01)
(58) Field of Classification Search
CPC ....................................................... H02J 3/01
See application file for complete search history.

(56) References Cited

U.S. PATENT DOCUMENTS

| 7,629,786 | B2 * | 12/2009 | Lee ......................... | H01F 30/12 |
| | | | | 307/105 |
| 9,543,879 | B2 * | 1/2017 | Toliyat .................... | H02P 25/22 |
| 9,667,163 | B1 * | 5/2017 | Damjanovic ........... | H02M 5/14 |

* cited by examiner

*Primary Examiner* — Hai L Nguyen
(74) *Attorney, Agent, or Firm* — Larson & Larson, P.A.; Frank Liebenow

(57) ABSTRACT

A zero sequence, fifth harmonic filter for reducing fifth harmonic distortion in a five-phase power distribution system includes five pairs of coils. Each coil has a first leg and a second leg and each pair of coils has a first coil and a second coil. The first leg of each of the first coils is connected to a corresponding phase of the power distribution system; one first leg to each of the five phases of the power distribution system. The first leg of each of the second coils is connected to a neutral of the power distribution system and the second leg of each of the first coils is connected to the second leg of a next second coil in a staggered fashion.

17 Claims, 4 Drawing Sheets

ZERO SEQUENCE, FIFTH HARMONIC FILTER FOR FIVE-PHASE POWER DISTRIBUTION SYSTEM

This invention relates to a zero sequence harmonic filter for five-phase power distribution system and, more particularly to a reduction of fifth harmonic and multiples of fifth, which are zero sequence harmonics, particularly in a five-phase power distribution system, thereby increasing energy efficiency and harmonic reduction.

BACKGROUND

Nonlinear loads such as switching power supplies used in personal computers, variable frequency drives (VFDs), and other electronic devices can generate excessive harmonic currents in five-phase distribution systems, including zero phase sequence harmonics, in commercial and industrial power distribution systems.

In a five-phase power distribution system, fifth harmonics and multiples of fifth harmonic are of zero-sequence nature. Having zero sequence harmonics often results in high voltage and current distortion, neutral conductor overloading, motor and power transformer overheating, increased losses, and excessive harmonic injection onto the utility supply system (e.g., power grid). Zero-sequence current flowing in the neutral conductor of the five-phase six-wire distribution power system is five times of the zero sequence harmonic components of each phase current (e.g., the sum of the zero sequence harmonic components on each phase). Therefore, zero-sequence current has the potential to cause main power quality problems. There is a need to mitigate the zero-sequence harmonic current.

There are several existing arrangements used to mitigate zero sequence currents in five-phase distribution system. One arrangement uses passive LC (inductor-capacitor) filters generally with capacitor-inductor combinations, as is widely used in the power systems harmonics mitigation. The passive filter LC filter removes some neutral harmonic current and is comprised of series and/or parallel capacitors and resonant inductors. These tuned circuits provide low or high harmonic impedance pathway for harmonics in five-phase distribution system. The filtering characteristic of the passive LC is determined by the ratio of filter impedance and system impedance. Other than the filtering characteristics, the passive LC filters have the following drawbacks:

LC filters are prone to be influenced by system parameters;

While LC filters remove/block several specific harmonics, LC filters amplify some of the harmonics; parallel series resonances If the harmonic current increases, there is a potential for the LC filter to overload;

Capacitor values change with the aging, resulting in the LC filters becoming less effective at the engineered harmonic frequencies.

With the development of power electronics technology, active filters have been implemented in place of LC filters. Active filters use power semiconductor devices that inject current to the network, with equal in amplitude but 180 degrees out of phase with the system harmonic current. When the out of-phase signal is added with the system harmonic current, the total harmonic current approaches zero. Although the active filter's performance is better than passive filter, its circuit topology, control complexity, high cost, and low reliability limits usefulness.

What is needed is a five-phase filter system that will reduce fifth harmonics with reduced costs and improved reliability.

SUMMARY

The present invention relates to five-phase power conditioning filters and, in particular, to magnetic zero phase sequence filters.

In a five-phase distribution system, a zero sequence electromagnetic harmonic filter reduces electromagnetic zero sequence harmonics. The filter has a lower impedance to zero phase sequence harmonic currents, including fifth harmonics and multiple of the fifth harmonic, reducing the flow and injection of such harmonics into the distribution network. The zero sequence harmonic filter is shunt connected to a five-phase distribution system. In one embodiment, the zero sequence electromagnetic harmonic filter includes coils wound on a single, five core limb or five single cores. The coils are connected in zig-zag fashion to provide low impedance for zero sequence currents. The zero sequence electromagnetic harmonic filter shunts the zero sequence harmonics from upstream of the five-phase distribution system. The disclosed zero sequence electromagnetic harmonic filter has several advantages compared to the know LC filters and active filters:

The zero sequence electromagnetic harmonic filter performances are not influenced by system parameters;

The zero sequence electromagnetic harmonic filter doesn't create parallel series resonances and, therefore, the zero sequence electromagnetic harmonic filter doesn't amplify any of the harmonic;

The zero sequence electromagnetic harmonic filter isn't easily overloaded;

The zero sequence electromagnetic harmonic filter performance and filtering efficiency does not change significantly over time;

The zero sequence electromagnetic harmonic filter has low cost, and high reliability;

Provided is a method for minimizing zero-sequence harmonics, particularly fifth harmonics and multiples of the fifth harmonic, using a magnetic filter in a five-phase distribution systems. The zero sequence electromagnetic harmonic filter is shunt connected the five-phase distribution system. In one embodiment, the zero sequence electromagnetic harmonic filter includes an autotransformer whose windings are zig-zag connected. The zero sequence electromagnetic harmonic filter uses five, single phase autotransformers connected in a five-phase zig-zag configuration, or one five-leg autotransformers.

The zero sequence fifth harmonic filter has a very low zero sequence reactance, but very high reactance for positive and negative-sequence components. The zero-sequence harmonics currents, fifth harmonic and multiple of the fifth harmonic, flow into the filter instead of the source, thus of reducing fifth harmonic currents and multiples of the fifth harmonic currents from the system. The zero sequence electromagnetic harmonic filter effectively reduces zero sequence, fifth harmonics and multiples of fifth harmonic and also attenuates the neutral current, thereby improving power quality in a five-phase distribution system.

In one embodiment, a zero sequence, fifth harmonic filter for reducing fifth harmonic distortion in a five-phase power distribution system is disclosed including five pairs of coils. Each coil has a first leg and a second leg and each pair of coils has a first coil and a second coil. The first leg of each of the first coils is connected to a corresponding phase of the power distribution system; one first leg to each of the five phases of the power distribution system. The first leg of each of the second coils is connected to a neutral of the power distribution system and the second leg of each of the first coils is connected to the second leg of a next second coil in a staggered fashion.

In another embodiment, a zero sequence, fifth harmonic filter for a five-phase power system is disclosed including a first coil pair having a first upper coil and a first lower coil, a second coil pair having a first upper coil and a first lower coil, a third coil pair having a first upper coil and a first lower coil, a fourth coil pair having a first upper coil and a first lower coil, and a fifth coil pair having a first upper coil and a first lower coil. The five-phase power system has a first phase conductor, a second phase conductor, a third phase conductor, a fourth phase conductor, a fifth phase conductor, and a neutral conductor. A first leg of the first upper coil is connected to the first phase conductor, a first leg of the second upper coil is connected to the second phase conductor, a first leg of the third upper coil is connected to the third phase conductor, a first leg of the fourth upper coil is connected to the fourth phase conductor, and a first leg of the fifth upper coil is connected to the fifth phase conductor. A second leg of the first upper coil is connected to a second leg of the second lower coil, a second leg of the second upper coil is connected to a second leg of the third lower coil, a second leg of the third upper coil is connected to a second leg of the fourth lower coil, a second leg of the fourth upper coil is connected to a second leg of the fifth lower coil, a second leg of the fifth upper coil is connected to a second leg of the first lower coil. The first leg of each of the lower coils is connected to the neutral conductor.

In another embodiment, a method of reducing fifth harmonic distortion in a five phase power distribution system is disclosed including connecting a first leg of a first upper coil of a first coil pair to a first phase conductor of a power distribution system, the first coil pair having the first upper coil and a first lower coil. A first leg of a second upper coil of a second coil pair is connected to a second phase conductor of the power distribution system in which the second coil pair includes the second upper coil and a second lower coil. A first leg of a third upper coil of a third coil pair is connected to a third phase conductor of the power distribution system in which the third coil pair includes the third upper coil and a third lower coil. A first leg of a fourth upper coil of a fourth coil pair is connected to a fourth phase conductor of the power distribution system in which the fourth coil pair includes the fourth upper coil and a fourth lower coil. A first leg of a fifth upper coil of a fifth coil pair is connected to a fifth phase conductor of the power distribution system in which the fifth coil pair includes the fifth upper coil and a fifth lower coil. The method includes connecting the second leg of the first upper coil to the second leg of the second lower coil, connecting the second leg of the second upper coil to the second leg of the third lower coil, connecting the second leg of the third upper coil to the second leg of the fourth lower coil, connecting the second leg of the fourth upper coil to the second leg of the fifth lower coil, and connecting the second leg of the fifth upper coil to the second leg of the first lower coil. Finally, each of the first leg of the first lower coil, the second lower coil, the third lower coil, the fourth lower coil, and the fifth lower coil are connected to a neutral conductor of the power distribution system.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
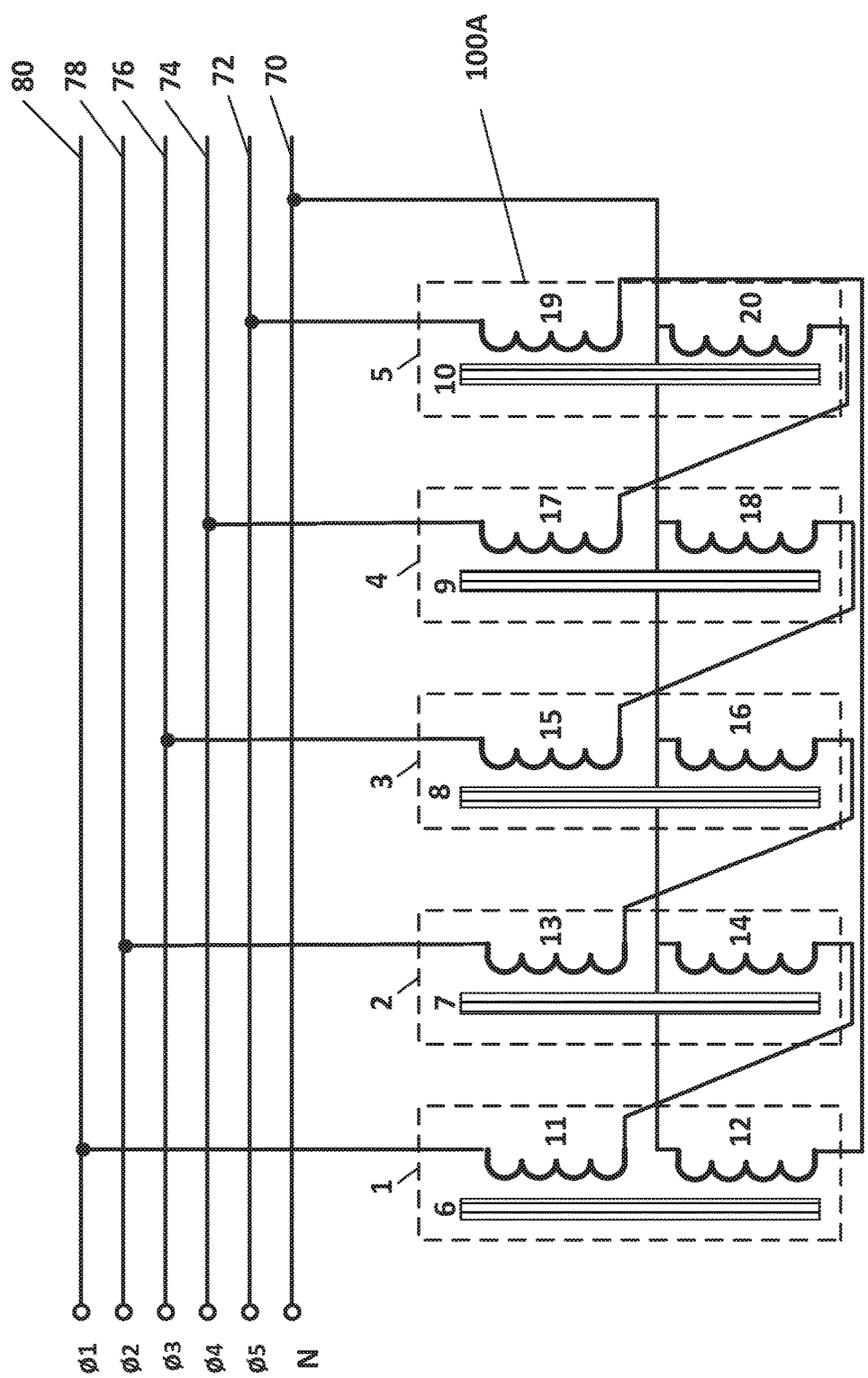
FIG. 1 is a schematic diagram of a five-phase zero sequence filter with five single-phase autotransformer coils connected in zig-zag configuration to construct a five-phase zero sequence filter.

Reference will now be made in detail to the presently preferred embodiments of the invention, examples of which are illustrated in the accompanying drawings. Throughout the following detailed description, the same reference numerals refer to the same elements in all figures.

Figure 2:
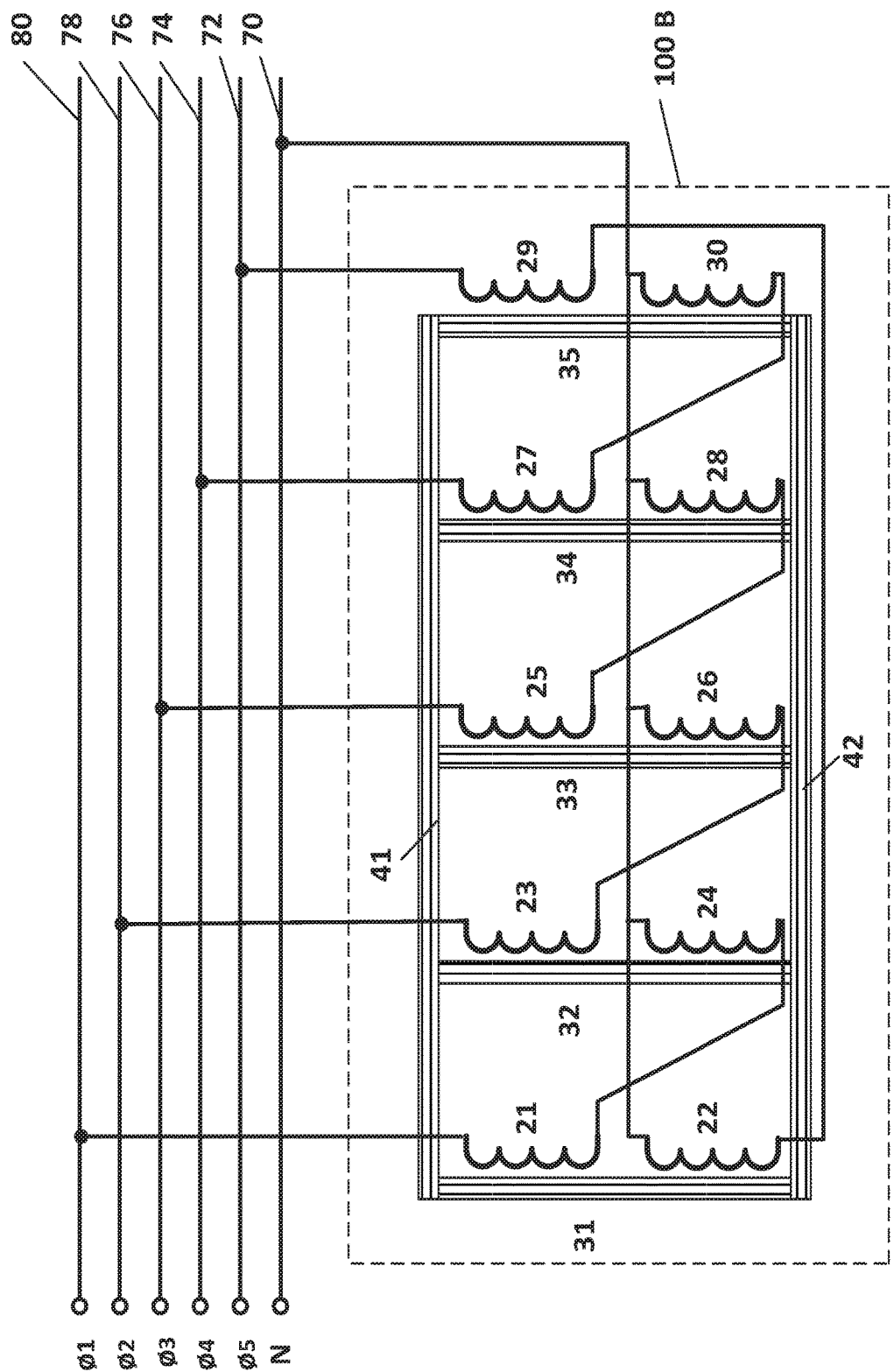
FIG. 2 is a schematic diagram of a five-phase zero sequence filter with a single autotransformers that has five segments, each segment having coils that are connected in zig-zag configuration.
Figure 3:
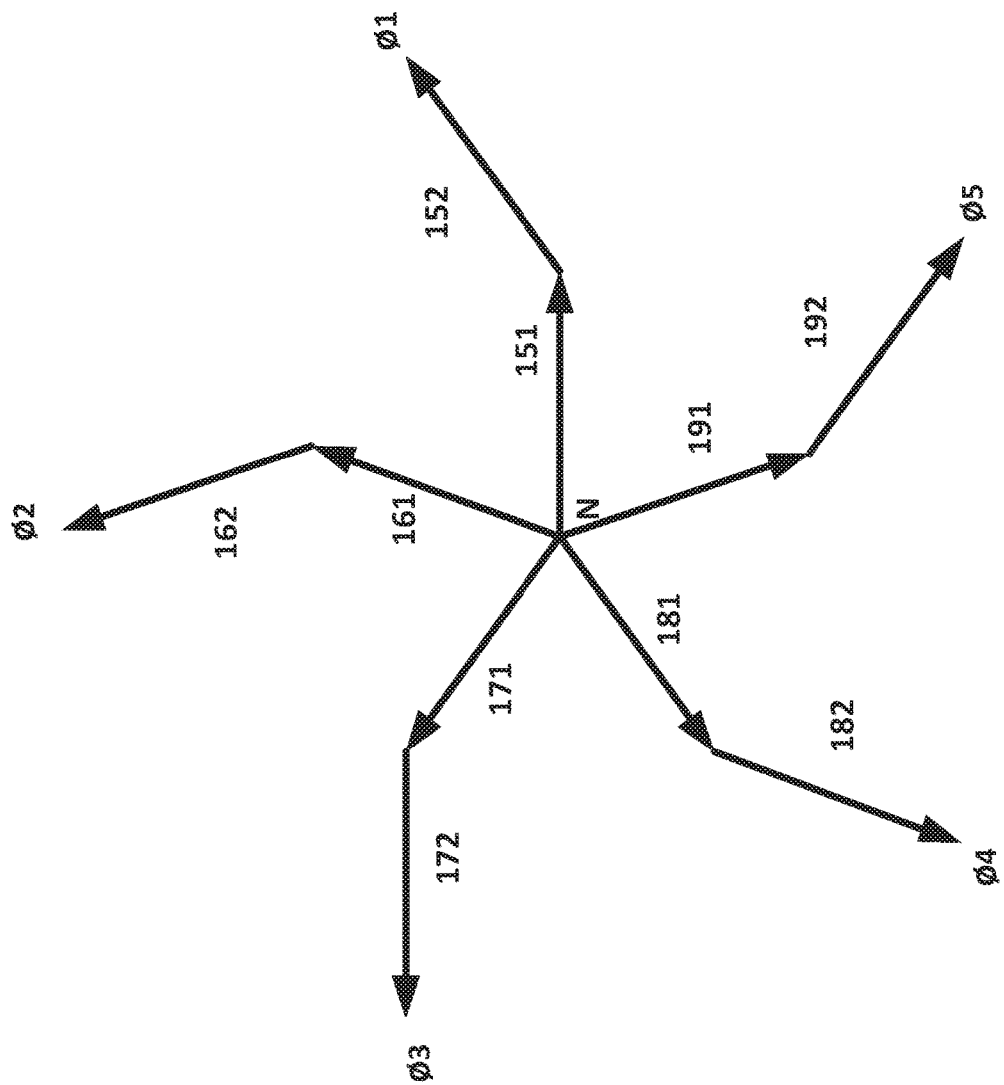
FIG. 3 is current vector diagram of a five-phase zero sequence filter for five-phase distribution power system.

With reference to the drawings, and in particular to FIGS. 1, 2, and 3 thereof, the zero sequence electromagnetic harmonic filter for five-phase distribution systems will be described.

The zero sequence electromagnetic harmonic filter for five-phase distribution system is anticipated to be produced in a variety of configurations. In one embodiment, the zero sequence electromagnetic harmonic filter is constructed using five single core autotransformers while in alternate embodiments, the zero sequence electromagnetic harmonic filter is constructed using one five leg (core) autotransformers. In both embodiments, the windings of the zero sequence electromagnetic harmonic filter are connected in zig-zag configuration, thus providing zero sequence filtering.

Referring to FIG. 1, a typical configuration of the zero sequence electromagnetic harmonic filter 100A is shown. In this configuration, there are five single core inductors 1/2/3/4/5. Each single core inductors 1/2/3/4/5 has a magnetic core 6/7/8/9/10 (respectively) and two identical windings 11/12/13/14/15/16/17/18/19/20. Two windings 11/12/13/14/15/16/17/18/19/20 are wound around each magnetic core 6/7/8/9/10: a first set of windings 11/12 wound on a first core 6; a second set of windings 13/14 wound on a second core 7; a third set of windings 15/16 wound on a third core 8; a fourth set of windings 17/18 wound on a fourth core 9; and a fifth set of windings 19/20 wound on a fifth core 10. For clarity, the upper coils 11/13/15/17/19 will be referred to as such as will the lower coils 12/14/16/18/20.

Although other configurations of winding connections are anticipated, the zero sequence electromagnetic harmonic filter 100A is shown with the lower coils 12/14/16/18/20 star connected. A north end of each lower coil 12/14/16/18/20 is connected to the neutral conductor 70 of the five-phase distribution system 70/72/74/76/78/80. The south end of the first upper coil 11 is connected to the south end of the second lower coil 14; the south end of the second upper coil 13 is connected to the south end of the third lower coil 16; the south end of the third upper coil 15 is connected to south end of the fourth lower coil 18; the south end of the fourth upper coil 17 is connected to the south end of the fifth lower coil 20; and the south end of the fifth upper coil 19 is connected to the south end of the first lower coil 12. The north end of the first upper coil 11 is connected to phase ø1 80; the north end of the second upper coil 13 is connected to phase ø2 78; the north end of the third upper coil 15 is connected to phase ø3 76; the north end of the fourth upper coil 17 is connected to phase ø4 74; the north end of the fifth upper coil 19 is connected to phase ø5 72.

Referring to FIG. 2, a typical configuration of the zero sequence electromagnetic harmonic filter 100B is shown. In this configuration, there is a single core 41/42 having five spindles 31/32/33/34/35. Each of the five spindles 31/32/33/34/35 has two identical windings of the windings 21/22/23/24/25/26/27/28/29/30. Two windings of the windings 21/22/23/24/25/26/27/28/29/30 are wound around each five spindles 31/32/33/34/35: a first set of windings 21/22 wound on a first core 31; a second set of windings 23/24 wound on a second core 32; a third set of windings 25/26 wound on a third core 33; a fourth set of windings 27/28 wound on a fourth core 34; and a fifth set of windings 29/30 wound on a fifth core 10. For clarity, the upper coils 11/13/15/17/19 will be referred to as such as will the lower coils 12/14/16/18/20.

Although other configurations of winding connections are anticipated, the zero sequence electromagnetic harmonic filter 100B is shown with the lower coils 22/24/26/28/30 star connected. A north end of each lower coil 22/24/26/28/30 is connected to the neutral conductor 70 of the five-phase distribution system 70/72/74/76/78/80. The south end of the first upper coil 21 is connected to the south end of the second lower coil 24; the south end of the second upper coil 23 is connected to the south end of the third lower coil 26; the south end of the third upper coil 25 is connected to south end of the fourth lower coil 28; the south end of the fourth upper coil 27 is connected to the south end of the fifth lower coil 30; and the south end of the fifth upper coil 29 is connected to the south end of the first lower coil 22. The north end of the first upper coil 21 is connected to phase ø1 80; the north end of the second upper coil 23 is connected to phase ø2 78; the north end of the third upper coil 25 is connected to phase ø3 76; the north end of the fourth upper coil 27 is connected to phase ø4 74; the north end of the fifth upper coil 29 is connected to phase ø5 72.

In the zero sequence electromagnetic harmonic filter 1006, the core has spindles (e.g., sub-cores) 31/32/33/34/35. To facilitate placing windings on the spindles 31/32/33/34/35, it is anticipated the core 41/42 be made of two identical yokes, an upper yoke 41 and a lower yoke 42. Alternately, the spindles 31/32/33/34/35 are split in any way known to facilitate winding of the coils 21/22/23/24/25/26/27/28/29/30 on the spindles 31/32/33/34/35/ The windings 11/12/13/14/15/16/17/18/19/20/21/22/23/24/25/26/27/28/29/30 are connected as described so that the zero sequence currents of the fifth harmonic and multiples of the fifth are flowing in opposite directions, thus canceling each other. In this way, the currents flowing into the zero sequence electromagnetic harmonic filter 100A/100B are filtered.

In FIG. 3, a vector diagram of the currents of the zero sequence electromagnetic harmonic filter 100B is shown. Each of the coils produce a pairs of vectors, 151-172, 161-182, 171-192, 181-152 and 191-162, which are in opposite direction. In five-phase systems, the fifth harmonics are of zero sequence nature and are in phase. This leads to cancelation of fluxes, thus providing low impedance (attenuation) for zero sequence currents.

Figure 4:
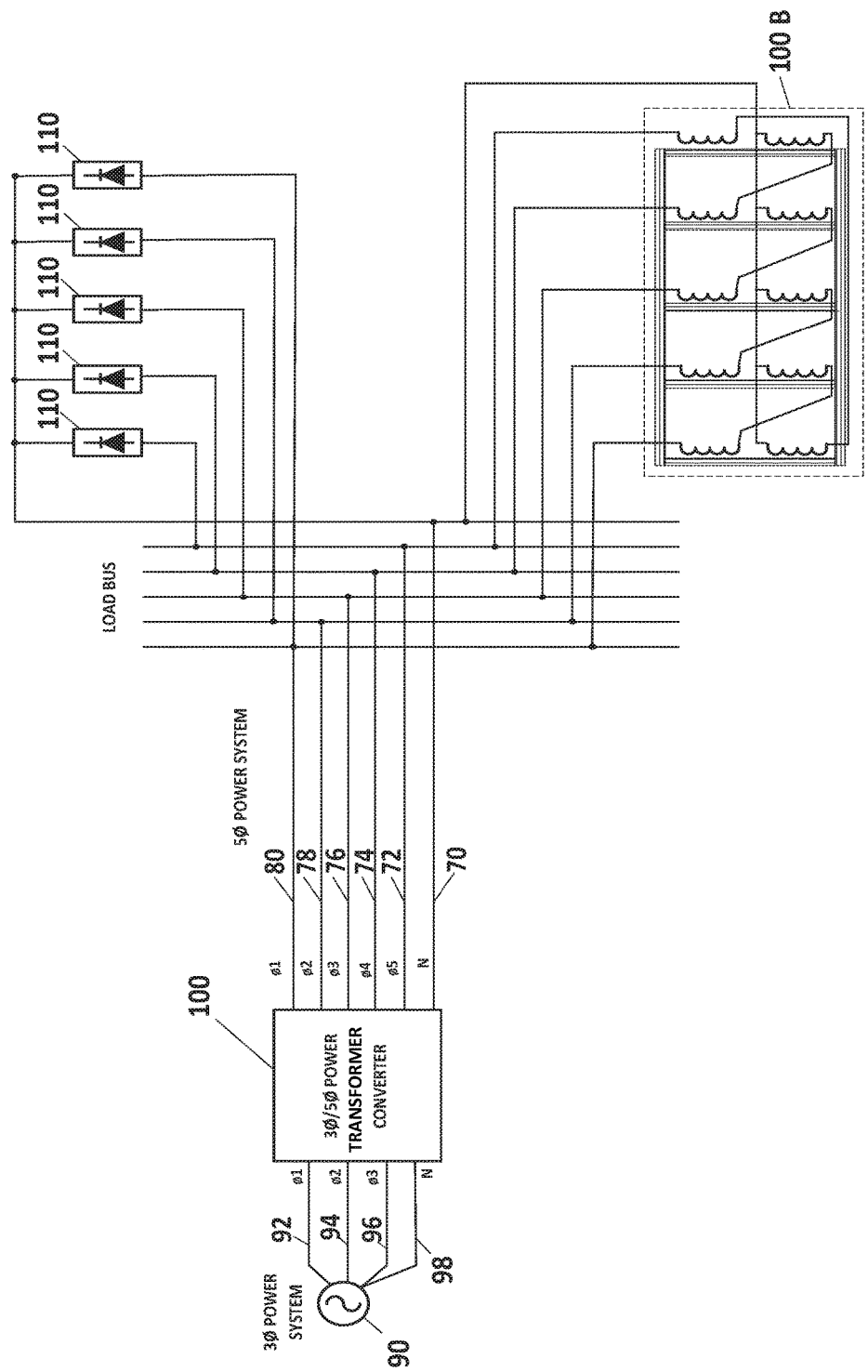
FIG. 4 is a schematic diagram of an application of the five-phase zero sequence filter in a five-phase distribution power system with non-linear loads.

Referring to FIG. 4, a diagram of a five-phase distribution system is shown with the zero sequence electromagnetic harmonic filter 100B (the zero sequence filter 100A is interchangeable with the zero sequence electromagnetic harmonic filter 100B). As described above, the zero sequence electromagnetic harmonic filter 100A/B are mounted on spindles of a monolithic core leg produce a pairs of vectors, 51-72, 61-82, 71-92, 81-52 and 91-62 are in opposite direction.

In FIG. 4, a diagram of a five-phase distribution system 111, with several single-phase, nonlinear loads 110 and the zero sequence electromagnetic harmonic filter 100b (or 100A). Although the zero sequence electromagnetic harmonic filter 100b (or 100A) reduces fifth harmonic energy in a variety of five-phase systems, for example purposes, a simple five-phase system is shown having a five-phase power bus 70/72/74/76/78/80 and one or more non-linear loads 110. In this exemplary five-phase distribution system 111, three-phase power is provided from a three-phase power system 90 and the three-phase power is converted to five-phase power by a three-phase to five-phase transformer 100, providing five-phase power to the five-phase bus 70/72/74/76/78/80.

Measurements related to the zero sequence electromagnetic harmonic filter 100A/100B are shown in Table 1 and Table 2. In Table 1, neutral currents of the load bus are shown with and without the Zero Sequence Filter. In Table 2, phase current profiles of the Zero Sequence Filter are shown.

TABLE 1

Neutral current on the load bus with and without Zero Sequence Filter

| Harmonic | Neutral Current Without Zero Sequence Filter [A] | Neutral Current With Zero Sequence Filter [A] |
|---|---|---|
| 1 | 0.08 | 0.67 |
| 3 | 0.35 | 0.11 |
| 5 | 9.92 | 5.26 |
| 7 | 0.47 | 0.30 |
| 9 | 0.35 | 0.20 |
| 11 | 0.06 | 0.06 |
| RMS | 10.00 | 5.33 |

TABLE 4

Five-phase currents profiles of the Zero Sequence Filter.

| Harmonic | $I_A$ [A] | $I_B$ [A] | $I_C$ [A] | $I_D$ [A] | $I_E$ [A] |
|---|---|---|---|---|---|
| 1 | 0.19 | 0.15 | 0.15 | 0.11 | 0.13 |
| 3 | 0.03 | 0.05 | 0.05 | 0.04 | 0.06 |
| 5 | 1.07 | 1.15 | 1.15 | 1.05 | 1.05 |
| 7 | 0.03 | 0.04 | 0.04 | 0.04 | 0.04 |
| 9 | 0.03 | 0.03 | 0.03 | 0.05 | 0.03 |
| 11 | 0.04 | 0.03 | 0.03 | 0.04 | 0.03 |
| RMS | 1.09 | 1.16 | 1.16 | 1.07 | 1.07 |

Note: the zero sequence electromagnetic harmonic filter 100A/100B is mitigating $5^{th}$ harmonic, which asserts neutral current on the five-phase bus 70/72/74/76/78/80. Therefore, the $5^{th}$ harmonic is reduced up-stream of the five-phase system.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A zero sequence, fifth harmonic filter for reducing fifth harmonic distortion in a five-phase power distribution system, the filter comprising:
    five pairs of coils, each coil having a first leg and a second leg and each pair of coils having a first coil and a second coil;
    the first leg of each of the first coils is connected to a corresponding phase of the power distribution system, one first leg to each of the five phases of the power distribution system;
    the first leg of each of the second coils is connected to a neutral of the power distribution system; and
    the second leg of each of the first coils is connected to the second leg of a next second coil in a staggered fashion;
    whereas the fifth harmonic filter for the five-phase power system reduces fifth-harmonic distortion.

2. The zero sequence, fifth harmonic filter for reducing fifth harmonic distortion in a five-phase power distribution system of claim 1, wherein each pair of coils is associated with an individual and separate magnetic core.

3. The zero sequence, fifth harmonic filter for reducing fifth harmonic distortion in a five-phase power distribution system of claim 1, wherein each pair of coils is wrapped around an individual and separate magnetic core.

4. The zero sequence, fifth harmonic filter for reducing fifth harmonic distortion in a five-phase power distribution system of claim 1, wherein each pair of coils is associated with a leg of a magnetic core.

5. The zero sequence, fifth harmonic filter for reducing fifth harmonic distortion in a five-phase power distribution system of claim 1, wherein each pair of coils is wrapped around a leg of a magnetic core.

6. A zero sequence, fifth harmonic filter for a five-phase power system, the filter comprising:
    a first coil pair having a first upper coil and a first lower coil;
    a second coil pair having a first upper coil and a first lower coil;
    a third coil pair having a first upper coil and a first lower coil;
    a fourth coil pair having a first upper coil and a first lower coil;
    a fifth coil pair having a first upper coil and a first lower coil;
    a power distribution system having six conductors, the six conductors including a first phase conductor, a second phase conductor, a third phase conductor, a fourth phase conductor, a fifth phase conductor, and a neutral conductor;
    a first leg of the first upper coil is connected to the first phase conductor, a first leg of the second upper coil is connected to the second phase conductor, a first leg of the third upper coil is connected to the third phase conductor, a first leg of the fourth upper coil is connected to the fourth phase conductor, a first leg of the fifth upper coil is connected to the fifth phase conductor;
    a second leg of the first upper coil is connected to a second leg of the second lower coil, a second leg of the second upper coil is connected to a second leg of the third lower coil, a second leg of the third upper coil is connected to a second leg of the fourth lower coil, a second leg of the fourth upper coil is connected to a second leg of the fifth lower coil, a second leg of the fifth upper coil is connected to a second leg of the first lower coil; and
    the first leg of each of the lower coils is connected to the neutral conductor;
    whereas the fifth harmonic filter for the five-phase power system reduces fifth-harmonic distortion.

7. The zero sequence, fifth harmonic filter for a five-phase power system of claim 6, wherein each pair of coils is associated with an individual and separate magnetic core.

8. The zero sequence, fifth harmonic filter for a five-phase power system of claim 6, wherein each pair of coils is wrapped around an individual and separate magnetic core.

9. The zero sequence, fifth harmonic filter for a five-phase power system of claim 6, wherein each pair of coils is associated with a leg of a magnetic core.

10. The zero sequence, fifth harmonic filter for a five-phase power system of claim 6, wherein each pair of coils is wrapped around a leg of a magnetic core.

11. The zero sequence, fifth harmonic filter for a five-phase power system of claim 6, wherein the zero sequence, fifth harmonic filter reduces fifth harmonic distortion on the power distribution system.

12. An method of reducing fifth harmonic distortion in a five phase power distribution system, the method comprising:
    reducing the fifth harmonic distortion in the five phase power distribution system by:
    connecting a first leg of a first upper coil of a first coil pair to a first phase conductor of a power distribution system, the first coil pair having the first upper coil and a first lower coil;
    connecting a first leg of a second upper coil of a second coil pair to a second phase conductor of the power distribution system, the second coil pair having the second upper coil and a second lower coil;
    connecting a first leg of a third upper coil of a third coil pair to a third phase conductor of the power distribution system, the third coil pair having the third upper coil and a third lower coil;
    connecting a first leg of a fourth upper coil of a fourth coil pair to a fourth phase conductor of the power distribution system, the fourth coil pair having the fourth upper coil and a fourth lower coil;
    connecting a first leg of a fifth upper coil of a fifth coil pair to a fifth phase conductor of the power distribution system, the fifth coil pair having the fifth upper coil and a fifth lower coil;
    connecting the second leg of the first upper coil to the second leg of the second lower coil;
    connecting the second leg of the second upper coil to the second leg of the third lower coil;
    connecting the second leg of the third upper coil to the second leg of the fourth lower coil;
    connecting the second leg of the fourth upper coil to the second leg of the fifth lower coil;
    connecting the second leg of the fifth upper coil to the second leg of the first lower coil; and connecting the first leg of the first lower coil, the second lower coil, the third lower coil, the fourth lower coil, and the fifth lower coil to a neutral conductor of the power distribution system.

13. The method of claim 12, wherein each pair of coils is associated with an individual and separate magnetic core.

14. The method of claim 12, wherein each pair of coils is wrapped around an individual and separate magnetic core.

15. The method of claim 12, wherein each pair of coils is associated with a leg of a magnetic core.

16. The method of claim 12, wherein each pair of coils is wrapped around a leg of a magnetic core.

17. The method of claim 12, wherein the zero sequence, fifth harmonic filter reduces fifth harmonic distortion on the power distribution system.

* * * * *